(12) United States Patent
Wolff

(10) Patent No.: US 9,713,341 B2
(45) Date of Patent: *Jul. 25, 2017

(54) FOOD PATTY

(75) Inventor: James B. Wolff, Portland, OR (US)

(73) Assignees: FORMTEC, LLC., Sheboygan, WI (US); SPHERICAL IP, LLC., Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/374,423

(22) Filed: Dec. 27, 2011

(65) Prior Publication Data

US 2013/0064961 A1   Mar. 14, 2013

Related U.S. Application Data

(63) Continuation-in-part of application No. 13/199,910, filed on Sep. 12, 2011, now Pat. No. 8,985,993.

(51) Int. Cl.
| | |
|---|---|
| A23L 1/317 | (2006.01) |
| A23L 13/60 | (2016.01) |
| A47J 43/20 | (2006.01) |
| A22C 7/00 | (2006.01) |
| B02C 18/36 | (2006.01) |
| B02C 18/30 | (2006.01) |
| A22C 17/00 | (2006.01) |

(52) U.S. Cl.
CPC .......... *A23L 13/67* (2016.08); *A22C 17/0006* (2013.01); *A47J 43/20* (2013.01); *A22C 7/00* (2013.01); *A22C 7/0076* (2013.01); *A22C 17/00* (2013.01); *B02C 18/30* (2013.01); *B02C 18/36* (2013.01)

(58) Field of Classification Search
CPC . A23L 13/67; A23L 13/60; A22C 7/00; A22C 7/0076; A22C 17/00; A22C 17/0006; A47J 43/20; B02C 18/30; B02C 18/36
See application file for complete search history.

(56) References Cited

U.S. PATENT DOCUMENTS

| | | | | |
|---|---|---|---|---|
| 3,793,466 | A * | 2/1974 | Kawkins et al. | 26/274 |
| 3,834,849 | A * | 9/1974 | Supran | A22C 7/00 425/206 |
| 3,903,315 | A * | 9/1975 | Giles et al. | 426/388 |
| 3,934,050 | A * | 1/1976 | Hawkins | A23L 1/3177 426/513 |
| 4,541,143 | A * | 9/1985 | Holly | 426/513 |
| 2001/0052558 | A1* | 12/2001 | Younker | B02C 18/302 241/82.1 |

OTHER PUBLICATIONS

Howdini; http://www.youtube.com/watch?v=GAibKAtlmGs.*

* cited by examiner

*Primary Examiner* — Yogendra Gupta
*Assistant Examiner* — Ninh Le
(74) *Attorney, Agent, or Firm* — Philip M. Weiss; Weiss & Weiss

(57) ABSTRACT

A food product having aligned fibers.

1 Claim, No Drawings

FOOD PATTY

RELATED APPLICATIONS

The present application is a continuation-in-part of application Ser. No. 13/199,910 filed on Sep. 12, 2011, now U.S. Pat. No. 8,985,993B2.

FIELD OF THE INVENTION

The present invention relates to an improved food patty.

BACKGROUND OF THE INVENTION

Current forming technology relies on high pressure, speed and complicated material flow pathways which produce a product lacking in quality. High pressure works the meat cells, the higher the pressure the more massaging or squeezing of the meat cells takes place. High speed combined with a complicated flow path massages and works the meat product, releasing myosin/actin from the cells causing the muscle fiber to bind together and contract (protein bind). The contraction takes place during high heat application as in cooking. The action of the meat fiber is to contract in length, this contraction combined with protein bind not only shortens the muscle fiber which if not controlled causes odd cook shapes but a rubber like texture with a tough bite.

In muscle, actin is the major component of thin filaments, which together with the motor protein myosin (which forms thick filaments), are arranged into actomyosin myofibrils. These fibrils comprise the mechanism of muscle contraction. Using the hydrolysis of ATP for energy, myosin heads undergo a cycle during which they attach to thin filaments, exerting a tension, and then depending on the load, perform a power stroke that causes the thin filaments to slide past, shortening the muscle.

Muscle fibril structure is measured from micrometers to several millimeters in length. These fibril structures are bundled together to form muscles. Myofibril proteins are the largest group and probably more is known about these proteins than any other. In muscle cells actin is the scaffold on which myosin proteins generate force to support muscle contraction. Myosin is the major protein that is extracted from the muscle cells by mechanical means.

An important purpose of tumbling and massaging is to solubilize and extract myofibril proteins to produce a protein exudate on the surface of the meat. The exudates bind the formed pieces together upon heating. Binding strength also increases with increased massaging or blending time. This is due to increased exudate formation on the surface of the meat. Crude myosin extraction is increased with increased blending time.

Grinding/chopping utilizes the concept of rupturing the cell to release protein. This mechanical chopping or shearing takes place at the shear/fill plate hole. This process extracts actin and myosin from muscle cells.

Mixing, utilizes friction and kinetic energy to release protein extraction. Fill hole shape and spacing can cause dead spots and turbulence in the meat flow. This change of direction is a form of mixing and massaging. This is another process, which extracts actin and myosin from muscle cells.

Massaging, utilizes friction and kinetic energy to increase protein extraction. This action takes place almost anywhere meat comes in contact with processing equipment and is moved or has a change of direction via pressure. This is also a procedure which involves extracting actin and myosin from muscle cells.

U.S. Pat. No. 4,315,950 relates to a cooking appliance having a plurality of parallel spaced heat transfer fins. An array of projecting cooking fins on which the hamburger patty is impaled are thermally connected to heat transfer fins. The cooking appliance is introduced into a water based liquid heating medium so that heat is transferred through the fins and projecting grills to the heat interior of the hamburger patty. In this way, cooking is accomplished in a relatively short period of time, and the amount of fat or meat juices boiled away is reduced.

U.S. Pat. No. 4,521,435 relates to a hamburger type meat patty and a method for reducing the weight loss of the patty by applying a juice retaining coating to the patty. The coating contains at least 30% by weight dry powdered egg whites.

U.S. Patent Publication No. 20050042321 relates to a molding apparatus for forming food patties having top and bottom surface contours. The device forms a two-dimensional horizontal profile patty that is curved or otherwise irregular to stimulate the shape of a food item, such as a chicken drumstick.

U.S. Patent Publication No. 20050214399 relates to an apparatus for forming food patties having surface indentations. A mold pattern having open areas and solid areas is arranged adjacent a first face of the cavity and indented from a second face. The patent teaches a patty having one or more grooves in a top surface thereof. The patent teaches a patty have one or more non-longitudinal depressions in at least the top surface of the patty.

U.S. Patent Publication No. 20070054005 relates to a molding apparatus for forming food patties having top and bottom surface contours. The invention teaches a patty having an irregular or curved profile taking through a vertical cross section and a horizontal cross section. The patent teaches a patty having both a top and bottom non flat surface contour.

SUMMARY OF THE INVENTION

It is an object of the present invention for the fiber orientation technology to reduce the release and mixing of myosin with actin. It is an object of the present invention for the fiber orientation technology to control orientation of the fiber. It is an object of the present invention for the fiber orientation technology to provide less myosin activity resulting in a better bite/bind and control over the final cook shape.

The present invention relates to a food product which is stretched to align the fibers of the product.

It is an object of the present invention for the patty to cool uniformly.

It is an object of the present invention for the patty to have a softened texture/bite.

It is an object of the present invention for the product to have little or no release of actin and myosin.

There are several factors which relate to a cooked meat patty. The factors are cook shape, color, texture or feel, retention of moisture, bite, protein exude.

With regards to current meat patties, the cook shape has a change in diameter and a fall off. The present patty has a consistent cook shape where the patty changes in diameter consistently and there is no fall off of the meat patty. The patty holds it shape. In the prior art, the user relied on the grill for the patty to hold its shape. With the patty of the current invention, the cook shape is held consistently and does not depend on the grill.

With regards to the color, the current patty has inconsistent color, delamination, voids and cracking due to an inconsistent transfer of temperature. In the present invention, the patty has a consistent color due to consistent contact with the grill.

With regards to the texture and feel, the current patties have a cross grain texture with more interference. The patty of the present invention has a through grain texture.

With regards to retention of moisture, the current patties have an inconsistent moisture retention. The patties of the present invention have a consistent controllable retention of moisture and retain more moisture than the prior art.

With regards to bite/rubbery, the current products create a rubbery patty product. The patty of the present invention is a non-rubbery product.

With regards to protein exude, the current patties exude protein. The patty of the present invention requires less mixing and therefore, there is more protein bound.

The patty of the present invention is not squeezed so there is less myosin squeezed from the cell membrane.

With regards to a product made from chicken, the current patty provides a less spongy product.

The present invention relates to an apparatus and method for accelerating food product in order to cause the product to be stretched aligning the fibers of the product. It is an object of the present invention for a hole or orifice to change size from a larger to a smaller diameter with vertical or concave sides having a sharp edge. The principle has design similarities to a venturi. It is referred to as a choke plate, nozzle, venturi, orifice, or a restriction to flow which results in product acceleration with a corresponding pressure drop through the orifice.

By reducing the cross-sectional area of a tube through which a substance passes, the velocity is increased. This is the principle of Conservation of Mass. When the velocity increases the pressure of the material is reduced. This is the principle of the Conservation of Energy.

For every liquid, there is a ratio between the cross-sectional area (C) and the cross-sectional area (c) through which velocity can only be increased by reducing temperature or increasing pressure. Although ground meat is not a homogeneous liquid, the same concepts still apply. It is impossible to attain choked flow unless there is a transition between the orifices and the small orifice has a finite length.

A venturi allows a smooth transition from a larger orifice to a smaller one. This transition minimizes flow transitions and thereby reduces restrictions in the system. The transition minimizes energy loss and supports fiber alignment.

The transition in a venturi is extremely difficult to create in a production tooling environment. As a result, using the geometric properties of a sphere or similar shape allows the ability to obtain many of the venturi effect properties using standard production practices.

All points on a sphere are the same distance from a fixed point. Contours and plane sections of spheres are circles. Spheres have the same width and girth. Spheres have maximum volume with minimum surface area. All of the above properties allow meat to flow with minimum interruptions. There are not static or dead zones. No matter what angle the cylinder intersects the sphere, the cross section is always a perfect circle.

It is an object of the present invention to increase meat velocity forcing linear fiber alignment.

It is an object of the present invention to have spherical geometry or a similar shape in fill or stripper plate to create venturi effects.

It is an object of the present invention for the process to make a patty cool uniformly and soften the texture/bite of the product.

All of this is accomplished by creating the venturi effect in any of a fill plate, stripper plate, breather plate, orifice plate for a grinding machine, and any combination of same.

Utilizing the properties of a sphere, the air can achieve acceleration by intersecting a cylinder with a sphere of a larger diameter.

In a sphere pressure is equal in all directions. Therefore, when the sphere is intersected by a cylinder, the air will move in a direction coaxial with the cylinder at a high velocity. The impact on the meat particles in the breather system is greater because air moving at a higher velocity will generate more momentum.

It is an object of the present invention to provide a venturi effect in the hole by creating a sphere to cylinder hole. This creates a venturi effect or a venturi pump. This accelerates the product through the hole. It is an object of the invention for this to create a self-cleaning breather plate. The spherical cut creates equal pressure in all directions. It is an object of the present invention for the spherical hemisphere or curved structure to have a diameter between 1.1 to 2.5 times greater than a cylindrical portion which intersects the same. It is preferred to have a sharper edge from the edge to the hole.

It is an object of the present invention to use spherical geometry, with cylindrical intersections, and the ratio of the diameter of the sphere divided by the area of the cylinder greater than or equal to approximately 1.1 to 2.5 to create conditions to meat flow which maintain improved cell structure.

Irregular shapes do not have diameters, but they do have areas. For a given ratio of a linear item, the ratio becomes the square of the linear ratio. For curved and irregular shapes, the ratio of the initial area and the reduced area is from approximately 1.2 to 6.25.

The present invention relates to a method for preparing a cooked meat patty comprising: placing a meat patty on a grill. The meat patty diameter changes in shape consistently. Little or no meat falls of the meat patty during grilling. The meat patty holds shape during cooking. The meat patty contacts the grill consistently to cause a consistent color in the meat patty.

DETAILED DESCRIPTION

The present invention relates to fiber orientation technology. The fiber orientation technology, aligns the fibers of meat so that the contraction of the muscle fiber that does take place is in a direction of choice controlling both bite and shrinkage. The fiber orientation technology provides a lower resistance to product flow.

The fiber orientation technology provides a better shear surface for a cleaner cut. The fiber orientation technology aligns the fibers in the fill hole so the shearing action disrupts as few muscle cells as possible. The fiber orientation technology decreases the total area of metal fill plate blocking the meat flow resulting in less direction change to the product which works the meat. The fiber orientation technology pulls the meat fiber through the fill hole instead of pushing using the principles of the venturi/choke plate.

All of these characteristics of fiber orientation technology reduce the release and mixing of myosin with actin, the net effect is a controlled orientation of the fiber, less myosin activity resulting in a better bite/bind and control over the final cook shape.

The process of the present invention makes a patty cool uniformly and soften the texture/bite of the product.

A spherical geometry feeding into a circular cross section which creates a product velocity increased while maintaining more consistent pressure on the meat. A sphere has the following properties:

All points on a sphere are the same distance from a fixed point.
Contours and plane sections of spheres are circles.
Spheres have the same width and girth.
Spheres have maximum volume with minimum surface area.
These properties allow meat to flow with minimum interruptions. There are no static or dead zones.
No matter what angle the cylinder intersects the sphere; the cross section is always a perfect circle.
Pressure inside of a sphere is uniform in all directions.

When meat is passed through a circular cross section of a sphere, the fact that pressure is uniform in a sphere creates forces which will be coaxial with the sphere. The reduction in area accelerates the meat through the cylindrical section of the fill plate. The acceleration has been shown empirically to align fibers in the primary direct of flow. Hence, there is fiber orientation.

The invention claimed is:

1. A method for preparing a ground meat patty comprising: forming a ground meat patty having a controlled orientation of aligned muscle fibers within said ground meat patty by placing ground meat through an orifice(s) which is configured to create a venturi or pressure drop; and wherein said orifice(s) comprises a sphere connected to a cylinder wherein said sphere is a constriction from a fixed point where a distance of said constriction is equidistant from said point.

* * * * *